March 25, 1947. E. RIVEROLL 2,417,949
PROCESS FOR RECOVERY OF IRON FROM ORE
Filed Aug. 21, 1943 4 Sheets-Sheet 3
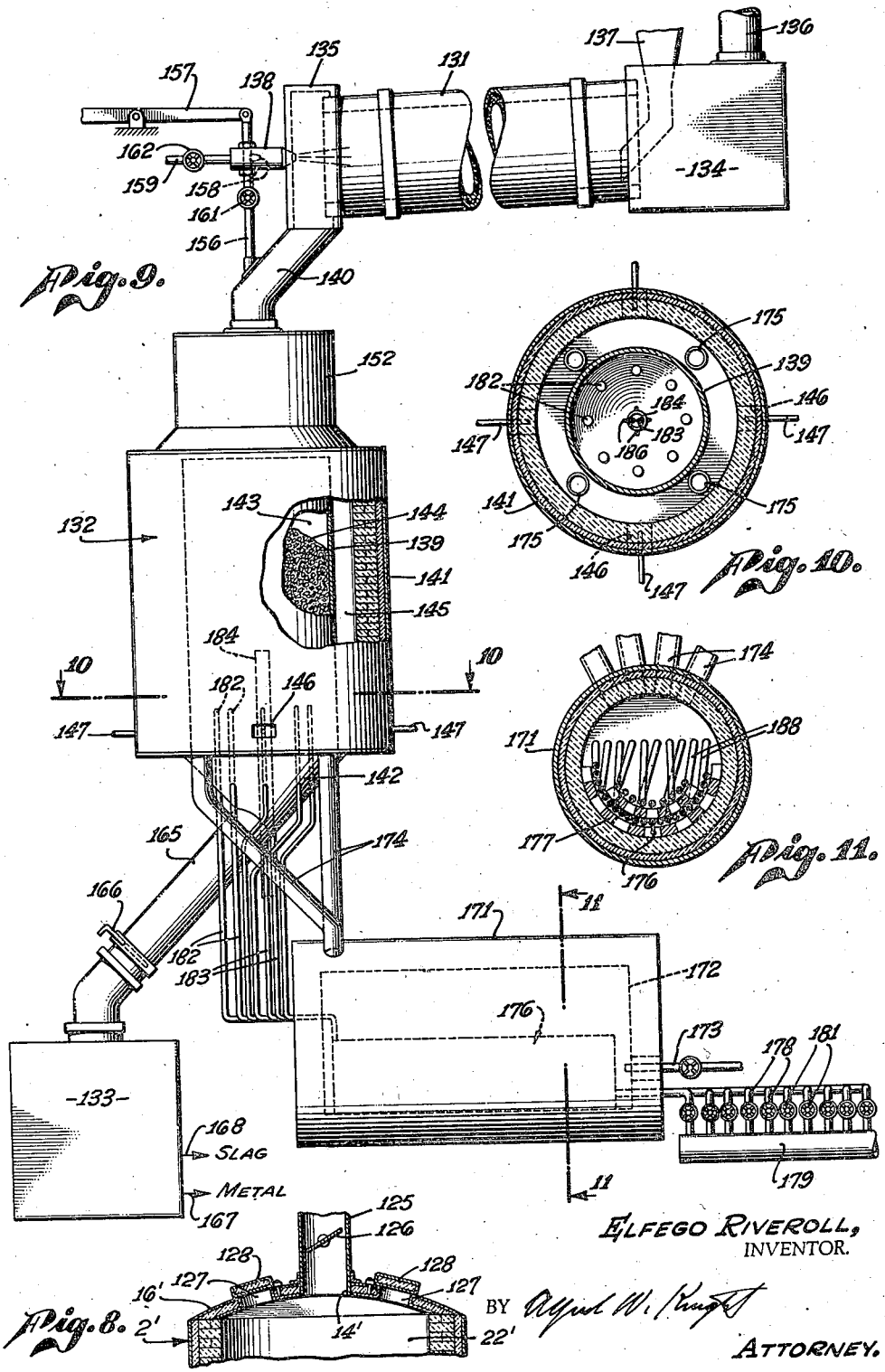
ELFEGO RIVEROLL,
INVENTOR.
BY
ATTORNEY.

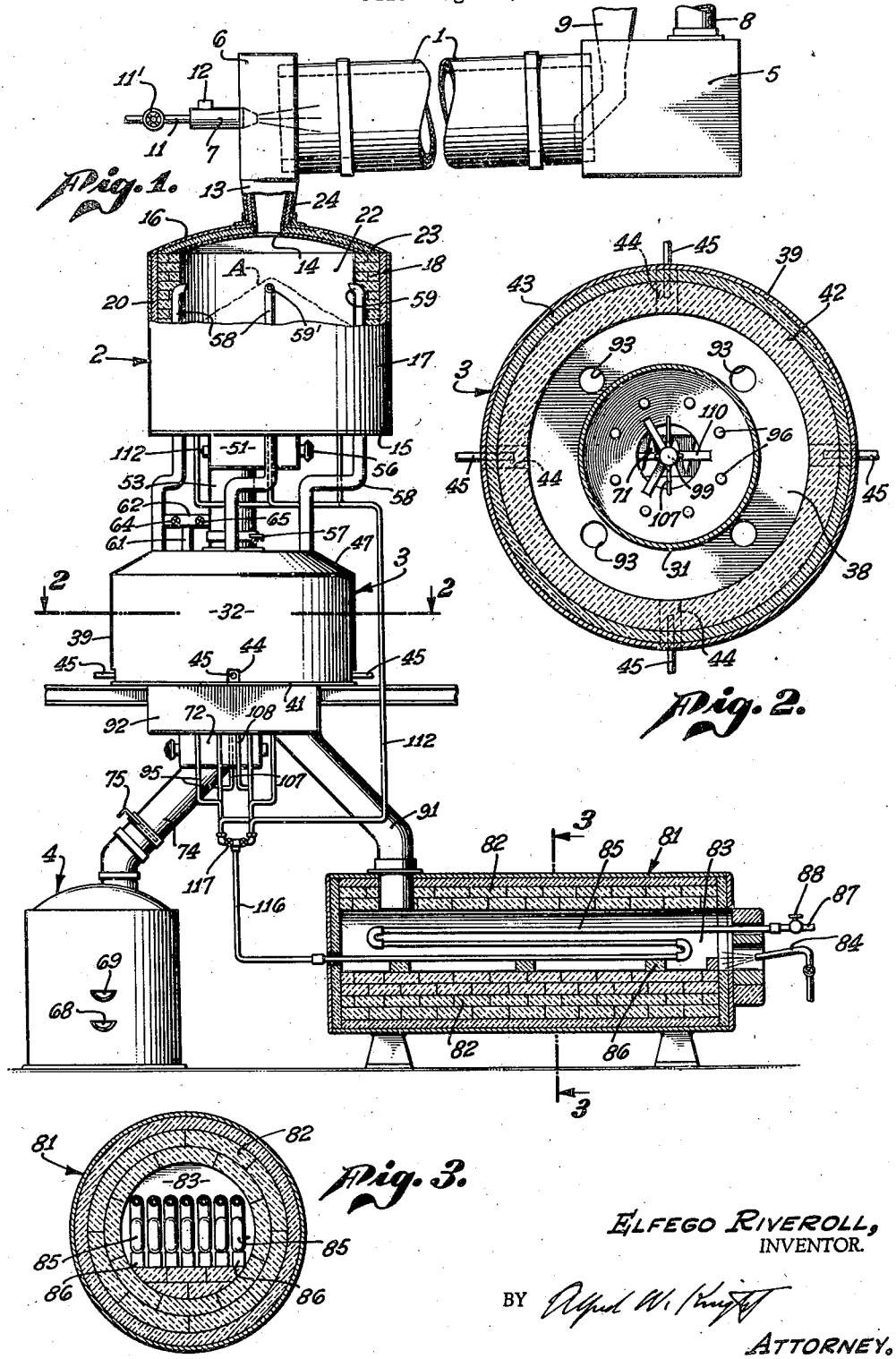

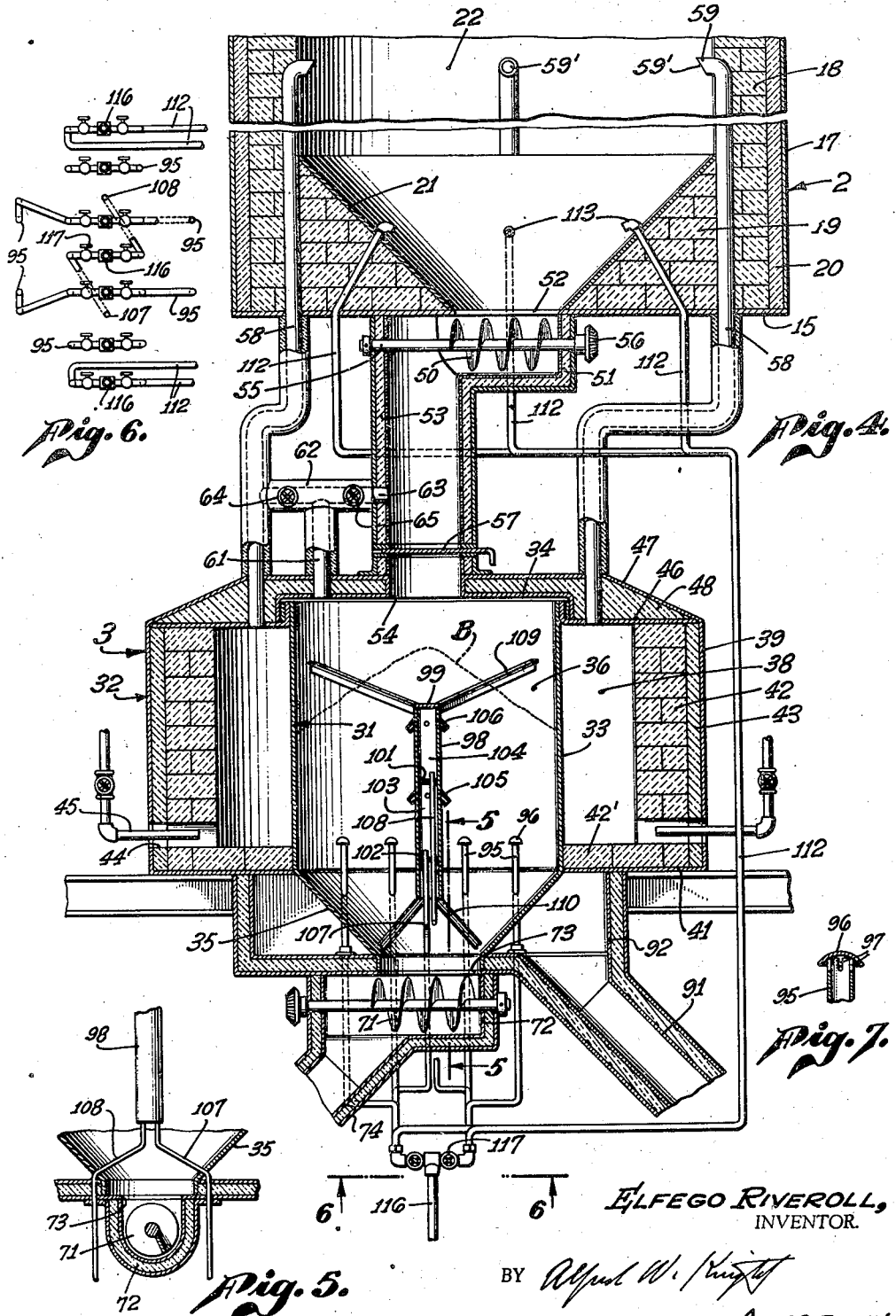

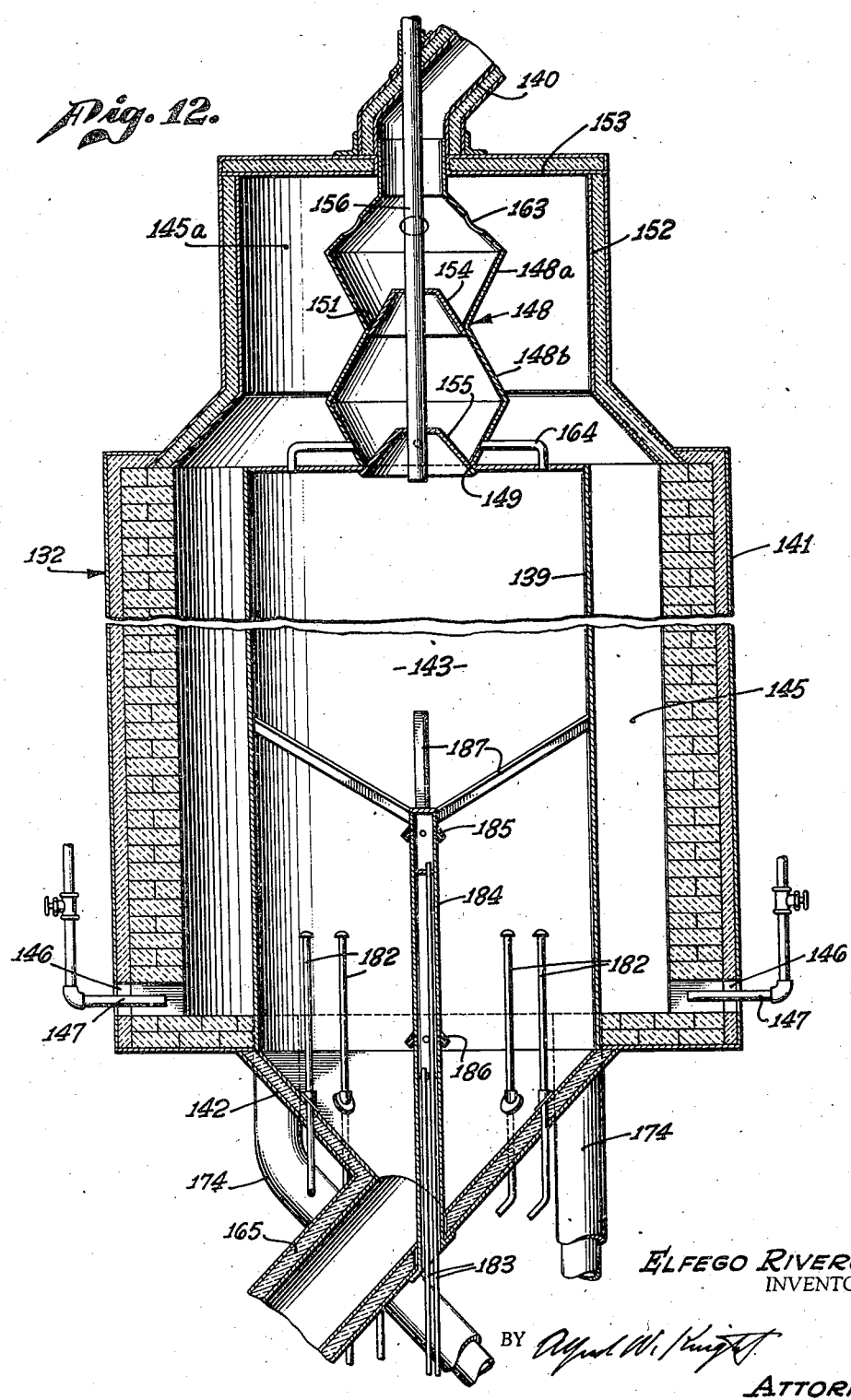

Patented Mar. 25, 1947

2,417,949

UNITED STATES PATENT OFFICE 2,417,949

PROCESS FOR RECOVERY OF IRON FROM ORE

Elfego Riveroll, Hermosa Beach, Calif.

Application August 21, 1943, Serial No. 499,511

10 Claims. (Cl. 75—38)

This invention relates to the recovery of iron from ores, and particularly to the reduction and recovery of iron from an ore containing one or more higher oxides thereof, that is, oxides in which the iron is in a higher state of oxidation than ferrous oxide, FeO.

The process is adapted particularly for the reduction and recovery of iron from ores containing hematite ($Fe_2O_3$) or magnetite ($Fe_3O_4$).

This application is a continuation-in-part of my application Serial Number 433,861, now U. S. Patent 2,340,346, for "Apparatus for recovering metal from ore," filed March 9, 1942.

The principal object of the invention is to provide a process for the recovery of iron from such ores, in which a hydrocarbon fluid (i. e., a hydrocarbon gas or liquid, or both) is used as the principal agent required for the reduction of the iron from its original oxidized state, in which the treatment of the ore is conducted in a plurality of successive stages, and in which the conditions in the several stages may be maintained in such manner that the heating of the ore and the reduction of the iron are accomplished efficiently and economically. In this connection, a particular object is to obtain a high degree of economy and freedom from operating difficulties by carrying out the successive stages in different types of furnaces or heating units, the characteristics of each furnace and the combined arrangement thereof being such that the furnace in each stage is particularly adapted to accomplish the treatment desired in that stage.

A further object of the invention is to provide a process for the above purpose in which the reduction of the iron does not require the introduction of any solid reducing agent, although, as will be explained, some solid reducing agent may if desired be used in the last stage of the process.

A further object of the invention is to provide an improved method for effecting the reduction of iron from its original state of oxidation in the ore to a state of oxidation lower than ferrosoferric oxide ($Fe_3O_4$) by contact at a suitably elevated temperature with a hydrocarbon fluid, and in which the reduction of the iron to metallic state may advantageously be completed by heating to a higher temperature in the presence of carbon deposited in the ore during the contact thereof with the hydrocarbon fluid.

Another object of the invention is to provide a process for the production of steel from iron ores, without requiring the ore or the reduced iron to be brought into contact with air or other nitrogen-containing gas at a temperature sufficient to cause absorption of nitrogen, thus permitting production of steel substantially free from nitrogen.

In accordance with the present invention the above objects, and other objects of the invention which will become apparent or will be pointed out hereinafter, are accomplished by means of a process in which the ore is preferably subjected to at least three successive and separate stages of treatment at elevated temperature, as described below.

In the first stage, the ore in a suitable crushed or divided condition is heated by direct contact with a gaseous heating medium to a temperature sufficient to remove all water present in the ore, and preferably substantially to the temperature at which the reduction is to be carried out in the second stage. I prefer to maintain a reducing atmosphere in this stage of the process so as to also effect some reduction of the iron therein. In addition to the drying, preheating, and partial reduction of the ore, an important function of this first stage is to cause at least the major portion of the expansion of the ore particles, due to heating thereof to the temperature required for subsequent reduction, to take place in this stage. This preheating stage is therefore preferably conducted in a furnace of the rotary kiln type in which the ore is brought into direct and intimate contact with the hot gases and is at all times free to expand. This preheating also serves, in the case of most ores, to produce a partial fracturing, splitting, or cracking of the ore particles (without causing the particles to actually break apart to any considerable extent), which promotes effective contact of the reducing gas in the next stage with all portions of the ore. The ore in this stage is preferably heated at least in part by combustion of gases leaving the reducing chamber of the next stage of the process and by residual heat of the combustion gases from the heating chamber of the next stage, as described hereinafter. Additional gas or other fuel may be supplied and burned in sufficient amount to maintain the desired temperature, but this usually is not necessary since the most advantageous results are obtained by operating under such conditions that the gases leaving the reducing stage contain sufficient combustible gases to provide, by combustion thereof, all the heat required in this preheating stage, as described more fully hereinafter.

In an intermediate stage, the dried and preheated ore is subjected to contact with a preheated hydrocarbon fluid at a temperature sufficient to cause partial reduction of the iron, for example, to cause reduction thereof to a lower oxide and partial reduction thereof to the metallic state, and to also cause deposition of carbon in the ore. This stage is carried out in a furnace arranged to provide for heating of the ore in one or more enclosed reducing chambers, and heated hydrocarbon fluid is introduced into contact with the ore at a plurality of suitably distributed positions in said chamber or chambers.

According to a preferred embodiment of the process, this intermediate or reducing stage is carried out in two successive steps, which may be referred to as auxiliary and main reducing steps. In each of these successive steps of this stage the ore is passed through an enclosed chamber and is brought into contact with the hydrocarbon fluid and is heated to keep it at an elevated temperature, preferably by direct contact with hot gases in the auxiliary reducing step and by indirect heating in the main reducing step. In this preferred embodiment the furnace employed in the auxiliary reducing step may in some cases be also used to complete the preheating of the ore to suitable temperature for reduction in the main reducing step, or the above-described preheating stage of the treatment may be effected wholly in this same furnace. This intermediate or reducing stage may, as a further alternative, be conducted in a single furnace, as illustrated in one of the embodiments hereinafter described.

The hydrocarbon fluid used for effecting the reduction is preheated, externally of the reducing chamber or chambers, to a temperature at least approximating, and preferably somewhat above, the temperature of the ore. The hydrocarbon fluid is at least partly decomposed upon contact with the ore at the existing temperature, resulting in the formation of gaseous products including hydrogen, and of solid carbon. The iron is partially reduced by reaction of the higher oxide or oxides thereof with the hydrogen and carbon, and possibly also by direct reaction with hydrocarbon fluid, resulting in the formation of FeO and some metallic iron. These reactions also result in the formation of gaseous products such as carbon monoxide or water vapor. These gaseous products are removed from the reducing chamber. The gases so removed may contain carbon monoxide, and also contain other combustible gases such as unreacted hydrogen or hydrocarbons, and I therefore prefer to burn these gases to provide at least part of the hot combustion gases employed in the preheating stage.

The conditions in the second stage, including temperature, time of contact, and the manner and rate of introduction of reducing gas, are such that part of the iron is reduced to the metallic state and the remainder is reduced to an oxide lower than $Fe_3O_4$, and some carbon formed by decomposition of the hydrocarbon fluid ordinarily remains in the ore. The ore is discharged from this stage in the form of particles containing the iron entirely in a condition less oxidized than $Fe_3O_4$, and also containing carbon either in free finely divided condition or combined with metallic iron.

The ore is then preferably subjected, in a third or final stage, to further heating, in the presence of sufficient carbon or other solid reducing agent and at sufficiently high temperature to complete the reduction of the iron to the metallic state and to cause fusion of the resulting steel or other ferrous metal product and the formation of a slag containing the gangue constituents of the ore. This final reducing and smelting operation is carried out in an enclosed chamber in which a reducing atmosphere is maintained and from which air is excluded, and is preferably conducted in an electric furnace of either the arc or induction type. In case the partially reduced ore discharged from the second stage does not contain sufficient carbon to complete the reduction of the iron in the third stage, I may add some additional coke or other form of carbon to the charge in the third stage. It will, of course, be understood that any desired fluxing agents such as are commonly used in smelting may be added to promote fusion of the gangue constituents and separation of the resulting molten slag from the molten metal.

The process may be better described in greater completeness and detail by reference to the accompanying drawings, which illustrate apparatus for use therein, such apparatus being claimed in my above-mentioned application Ser. No. 433,861.

Referring to the drawings:

Fig. 1 is a partly sectional side elevation of one form of apparatus, in which the treatment of the ore is conducted in four successive furnaces;

Fig. 2 is a horizontal section on line 2—2 in Fig. 1;

Fig. 3 is a vertical section on line 3—3 in Fig. 1;

Fig. 4 is a vertical section on a larger scale of the main reducing furnace and part of the auxiliary reducing furnace shown in Fig. 1;

Fig. 5 is a fragmentary vertical section of the lower portion of the main reducing furnace, taken on line 5—5 in Fig. 4;

Fig. 6 is an inverted horizontal section on line 6—6 in Fig. 4, showing the pipes for supplying hydrocarbon fluid;

Fig. 7 is a vertical sectional view of one of the pipes or nozzles through which hydrocarbon fluid is introduced into the ore in the main reducing furnace;

Fig. 8 is a vertical section of the upper portion of a modified form of furnace that may be substituted for the auxiliary reducing furnace of Fig. 1 in case it is desired to utilize this furnace for drying and preheating the ore and to omit the rotary kiln shown in Fig. 1;

Fig. 9 is a partly diagrammatic side elevation of another form of complete apparatus, with certain parts broken away;

Fig. 10 is a horizontal section on line 10—10 in Fig. 9;

Fig. 11 is a vertical section on line 11—11 in Fig. 9; and

Fig. 12 is a vertical section, on a larger scale, of the reducing furnace shown in Fig. 9.

The apparatus shown in Fig. 1 comprises a rotary kiln 1, an auxiliary reducing furnace 2, a main reducing furnace 3, and an electric furnace 4.

The rotary kiln 1 is inclined downward from right to left and may be provided with any suitable conventional means, not shown, for rotating the kiln about its longitudinal axis. The upper and lower ends of the kiln extend into and communicate with housings 5 and 6 respectively, and the kiln is provided at its lower end with burner means 7 for introducing air with or without added fuel, to maintain combustion within the kiln which constitutes the ore preheating chamber. Kiln 1 is also provided at its upper end with a stack 8 for discharge of waste gases and with means such as feed spout 9 for supplying ore in crushed or suitably divided condition into the upper end of the kiln. Burner 7 is shown as provided with a fuel supply pipe 11 having means such as valve 11' for regulating the supply of fuel, and with an opening as indicated at 12 for admission of air to the burner, the supply of air being regulated in any suitable manner.

A suitable conduit 13 connects the lower end housing 6 to the upper end of the auxiliary reducing furnace 2, for conducting the ore from the kiln 1 to furnace 2 and for conducting gaseous products from furnace 2 to kiln 1. Said conduit is preferably centrally located with respect to furnace 2.

Referring to Figs. 1 and 4, the auxiliary reducing furnace 2 comprises a bottom wall 15, a dome-shaped top wall 16 and a side wall 17 preferably of cylindrical shape, formed of steel or other suitable metal. The side and bottom walls are lined with refractory brick as indicated at 18 and 19, and an inner conical bottom wall 21 is preferably provided, forming the bottom of an ore-receiving chamber 22 within the furnace and protecting the refractory brick 19. Top wall 16 is provided with a central opening 14 through which the conduit 13 communicates with chamber 22. A layer of heat insulating material 20 is preferably provided between the refractory lining 18 and side wall 17. The top wall 16 and conduit 13 are shown as being of double-walled construction and provided with suitable heat insulating material as indicated at 23 and 24.

The main reducing furnace 3 comprises an inner housing 31 and an outer housing or shell 32, the construction of which is best shown in Figs. 2 and 4. The inner housing includes a side wall 33 formed as a vertically extending cylindrical shell, a top wall 34, and a conical bottom wall 35, defining therewithin a completely enclosed vertically extending reducing chamber 36, from which air is excluded substantially completely and in which a vertically extending body of ore is continually maintained during operation of the apparatus. Said reducing chamber is provided with means hereinafter described for admitting hydrocarbon fluid thereto under suitable pressure, and is preferably provided with means for maintaining a pressure in the reducing chamber slightly greater than atmospheric pressure.

The outer housing 32 is also cylindrical in shape and extends throughout the major portion of the height of the inner housing, to define an annular furnace chamber 38 surrounding the reducing chamber 36 throughout the major portion of its height. The outer housing is shown as comprising a cylindrical side wall or shell 39 and a bottom wall 41, constructed of steel or other suitable metal, the side and bottom walls being lined with refractory brick as indicated at 42 and 42', and the side wall being preferably also provided with a layer of heat-insulating material indicated at 43. Adjacent the lower end of the outer housing are four burner openings 44 spaced 90° apart, in which are mounted burner means such as nozzles 45 to which combustible gas or other fuel is supplied, said burner means serving to supply hot combustion gases to the furnace chamber 38. The outer housing also includes a top wall 46 closing the upper end of said furnace chamber. The furnace is provided with an outer top wall 47 above and spaced from top walls 34 and 46, and the space therebetween is filled with suitable heat-insulating material as at 48.

Suitable means are provided for conducting ore from the chamber 22 of furnace 2 to the reducing chamber 36 of furnace 3. For this purpose I have shown a screw conveyer or feeder 50 mounted within a trough or housing 51 into which the ore falls through a central opening 52 in the bottom of chamber 22. A vertical chute or conduit 53 extends downward from conveyer housing 51 to a central opening 54 at the upper end of chamber 36. The conveyer 55 is shown as provided with a bevel gear 56 by means of which it may be rotated continuously or intermittently to convey ore from opening 52 to the upper end of chute 53. I prefer to operate with a continuous movement of ore through the system, but in order to permit intermittent operation if desired, I have provided a sliding gate 57 in chute 53, which may be moved to open or closed position.

Suitable means are provided for conducting hot combustion gases from the annular chamber 38 of furnace 3 into the ore chamber 22 of furnace 2, preferably at a plurality of positions in the upper portion thereof. For this purpose I may provide four pipes 58 spaced 90° apart, opening at their lower ends through the top wall 46 of chamber 38. At their upper ends these pipes extend upward through the refractory lining 18 of furnace 2 to positions above the mid-height of chamber 22 and preferably near the upper end thereof, where they open into said chamber. The upper ends of said pipes are shown as bent inward as at 59 so as to deliver gases in a generally horizontal inward direction into the chamber, and the extreme inner ends are shown as inclined outward and downward as at 59' to prevent ore from entering the pipes.

I also provide means for conducting gases from the upper end of reducing chamber 36 to the preheating furnace, preferably through the chamber 22 of furnace 2. The means for this purpose is shown as including a pipe 61 opening at its lower end into the upper end of the reducing chamber and connected at its upper end to one of the pipes 58, as by pipe 62. It will be understood, of course, that similar connecting pipes 62 may also be provided for connecting pipe 61 to one or more of the other pipes 58. In addition, I have also shown another pipe 63 connecting pipe 61 to the lower portion of the vertical chute 53, so that some of the gases from the reducing chamber 36 may be introduced into contact with the ore in said chute. Pipes 62 and 63 are shown as provided with valves 64 and 65 for controlling and distributing the flow of gas and for maintaining a suitable pressure within the reducing chamber 36. It will of course be understood that when gate 57 is open to permit downward movement of ore, a large portion of the gases from chamber 36 will pass upward through chute 53 and through the ore body in chamber 22, but such ore body imposes sufficient resistance to flow of gas to maintain a slight superatmospheric pressure in chamber 36 under these conditions.

The electric furnace 4 may be an arc furnace or induction furnace of a conventional "air-tight" type, adapted to exclude air from the interior thereof and provided with means for electrically heating the partially reduced ore therein to a sufficiently high temperature for completing the reduction and for smelting the resulting metal. This furnace is also provided with means for discharge of molten metal and slag as indicated at 68 and 69, the actual construction and arrangement of such discharge means and other parts of the furnace being dependent upon the particular type of furnace employed. The specific construction of this furnace is not shown and further description thereof is believed unnecessary. I may use any one of a number of specific types whose construction and operation is well known in the art.

For delivering ore from the bottom of the reducing chamber 36 to the electric furnace 4 I have provided a short screw conveyer or feeder 71 mounted within a trough or housing 72 into which the ore falls through a central opening 73 at the bottom of chamber 36. Conveyer 71 is similar in construction and operation to the conveyer 50 above described, and an inclined chute 74 leads from conveyer housing 72 to the upper end of furnace 4, said chute being provided with a sliding gate 75 or other suitable means movable to position to open and close the chute to movement of ore. Thus, the ore may be delivered continuously or intermittently into the electric furnace. The lower end of chute 74 is connected to the electric furnace in such manner as to communicate with the interior thereof in a substantially air-tight manner. However, in order to positively prevent leakage of air into furnace 4, chute 74, or reducing chamber 36, it will be understood that the gases therein are normally maintained at a slight superatmospheric pressure. In case the lower end of chute 74 is disconnected from the furnace for any reason during operation, the gate 75 may be closed to further prevent access of air into the reducing chamber 36.

The apparatus is also provided with means for preheating hydrocarbon fluid and with conduits or pipes for introducing the preheated fluid into the reducing chamber 36 of furnace 3, and preferably also into the ore-receiving chamber 22 of furnace 2. This preheated hydrocarbon fluid is preferably introduced into chamber 36 at a plurality of positions intermediate the height of the heating chamber 38 (i. e., intermediate the height of the externally heated zone within the reducing chamber), and into chamber 22 at a plurality of positions adjacent but somewhat above the lower end thereof.

The fluid preheater is indicated at 81 and is shown as comprising a cylindrical furnace housing provided with a refractory lining 82 defining a combustion chamber 83. Suitable burner means 84 are provided at one end of the combustion chamber, to which combustible gas or other fuel is supplied for maintaining a flame directed into the combustion chamber. A plurality of heating coils 85 are provided, extending longitudinally within the combustion chamber 83 and supported on suitable supporting means 86. The furnace and the heating coil means therein are preferably so constructed and arranged that any one or all of the coils may be readily disconnected and removed from the furnace for the purpose of cleaning out carbon or coke deposited therein, and replaced by clean coils. I prefer to provide a separate supply line 87 for supplying hydrocarbon fluid to each of the heating coils, said supply lines being connected to any suitable source of supply of hydrocarbon fluid under pressure and being each provided with a separate valve 88 for controlling the admission of fluid to the corresponding coil 85. In the particular arrangement shown, seven heating coils are provided, from which the preheated fluid is conducted to chambers 36 and 22 by separate pipes or conduits, as described hereinafter.

A flue 91 communicates with the combustion chamber 83 at the end opposite the burner 84, for conducting hot combustion gases, after giving up part of their heat to the fluid within the coils, into the lower end of the furnace chamber 38 of furnace 3. Said flue is shown as connected at its upper end to an annular housing 92, which surrounds the conical lower portion 35 of the inner housing 31 and communicates with the chamber 38 through a plurality of angularly spaced openings as indicated at 93 in Fig. 2. Flue 91 may, if desired, be provided with suitable damper means for regulating the draft at the burner 84.

The means for introducing preheated hydrocarbon fluid into the reducing chamber 36 is shown as comprising eight pipes 95 which extend up through the bottom of the inner housing 31 and open into chamber 36 at their upper ends at positions between the axis and periphery of said chamber and equally spaced about the axis thereof. As illustrated particularly in Fig. 7, each of the pipes 95 is provided with a cap 96 extending over the upper end thereof and with a plurality of openings 97 below said cap, in order to prevent the ore from entering the pipe while permitting outflow of the reducing fluid into the ore body. Referring to Fig. 4 it will be seen that each of the pipes 95 communicates with the interior of the reducing chamber 36 within the lower portion of said chamber and at a level somewhat above the bottom of the surrounding furnace chamber 38. The pipes 95 themselves are not seen in Fig. 2, but the positions thereof are apparent from the positions of the caps 96 shown in that figure.

The means for supplying hydrocarbon fluid to chamber 36 also comprises a centrally located vertical pipe 98 extending from a position somewhat above the bottom of the chamber upward to a position preferably somewhat above the mid-height of the chamber, said pipe being closed at its upper end as indicated at 99 and provided with spaced partition members 101 and 102 defining two separate chambers 103 and 104 within the pipe. Two sets of outwardly projecting nozzles or orifice members 105 and 106 are provided at different levels intermediate the height of chamber 38, communicating respectively with the lower and upper chambers 103 and 104 and opening outwardly into chamber 36. I have shown four such nozzle members in each set spaced 90° apart around the pipe, and these members are preferably inclined downward and outward so as to discharge the fluid into the ore body in a downwardly inclined direction and prevent the ore particles from entering the nozzles. Pipes 107 and 108 extend upward within pipe 98 and communicate respectively with chambers 103 and 104. Pipe 98 may be supported at its upper and lower ends by means of bars secured to the walls of chamber 36, as indicated at 109 and 110 respectively.

The means for introducing fluid from the preheater 81 into the ore chamber 22 of furnace 2 is shown as comprising four pipes 112 extending up through the bottom wall 15 and through the conical wall 21 into the lower portion of said chamber, and each of said pipes is provided at its upper end with a nozzle member 113 directed downward and inward for delivering the fluid into the ore body in a downwardly inclined direction while preventing the ore particles from entering these pipes. Nozzles 113 are spaced 90° apart around the chamber and communicate with the lower portion thereof at positions somewhat above the lower end of the chamber.

Referring particularly to Figs. 1, 4 and 6, the pipes 95, 107, 108 and 112 are shown as extending downward to a position near the rear end of preheater 81, and connected in pairs to pipes 116 which extend through the rear wall of the preheater 81 and are connected to the respective heating coils 85. The eight pipes 95 are connected, in four groups of two each, to four of the pipes 116; the pipes 107 and 108 are connected to one of the pipes 116; and the pipes 112 are connected, in two groups of two each, to the remaining two pipes 116. Each of the pipes 95, 107, 108 and 112 is preferably provided with a separate valve 117 to provide for separate regulation of the flow of fluid through the several pipes.

Although no ore is shown within the chambers 22 and 36, it will be understood that during normal operation of the apparatus a body of ore is continually maintained in each of these chambers, up to a level somewhat above the positions at which hydrocarbon fluid is introduced, as indicated, for example, by the dotted lines at A and B in Figs. 1 and 4, respectively. The ore level A in chamber 22 is considerably above the nozzles 113, but is somewhat below the upper ends 59 of the gas conducting pipes 58, while the ore level B in chamber 36 is considerably above the upper ends of pipes 95 and somewhat above the upper set of nozzles 106. The ore particles are of such size as to form a pervious bed through which the introduced fluid may pass without disturbing the ore particles and without undue resistance to circulation of gas or other fluid.

In carrying out the process in the above-described apparatus, an ore containing iron in a state of oxidation higher than ferrous oxide (such as $Fe_2O_3$ or $Fe_3O_4$) is introduced into the upper end of the preheating chamber in rotary kiln 1 and is heated therein by direct contact with hot combustion gases from burner 7 and also by hot gases entering the kiln through conduit 13 from furnace 2. In case these latter gases contain combustible constituents, as is usually the case, a sufficient amount of excess air may be admitted at or adjacent the burner 7 for combustion of these constituents, to assist in heating the ore passing through the rotary kiln 1. The ore is introduced in suitably crushed or divided condition, for example, principally in the form of particles of about one-eighth to three-quarters inch average diameter, and is heated in the kiln to thoroughly dry it and to preheat it in the first stage of the treatment, preferably to a temperature substantially equal to or closely approximating the temperature to be maintained in the subsequent reducing stage. In general, I prefer to heat the ore in this first stage to a temperature between about 400° C. and about 900° C., and preferably between about 650° C. and about 800° C.

In most cases, I prefer to so regulate the supply of air to burner 7 in proportion to the supply of fuel and/or the quantity of combustible gases delivered to the kiln from the subsequent reducing stage of the process, as to maintain a reducing atmosphere therein, so as to cause some reduction of iron in the preheating stage of the process. For example, if the ore contains $Fe_2O_3$, it may be reduced completely or partially to $Fe_3O_4$ or some other lower oxide within the rotary kiln 1.

The ore within the rotary kiln is at all times free to expand upon heating thereof, and this preheating of the ore in this manner serves to prevent the ore from undergoing any substantial further expansion within the body of ore held in the reducing chamber in the next stage. By thus causing the thermal expansion of the ore particles to take place in the first stage, I eliminate the possibility of the ore becoming tightly jammed or wedged in the reducing chamber, as frequently occurs if it is attempted to heat the ore from a materially lower temperature to the temperature required for reduction, at a position substantially below the upper surface of a relatively stationary body of ore, where the ore particles are not free to expand and consequently tend to become jammed or stuck due to the forces of thermal expansion resulting from such heating.

The heating of the ore to the above-mentioned temperature and the resulting expansion, in the first stage, also produces fracturing, splitting, or cracking of the ore particles (without appreciable disintegration or breaking up of the particles), and the resulting cracks or fissures serve to promote effective contact of the reducing fluid with the material in the interior of the particles, in the second stage.

The rotary kiln is preferably operated continuously and the dried and heated ore is discharged from the lower end thereof through conduit 13 into the chamber 22 of furnace 2.

In chamber 22 the ore is kept heated by means of hot combustion gases introduced through pipes 58, and is also brought into contact with preheated hydrocarbon fluid introduced through nozzles 113, which serves to effect partial reduction of higher oxides of the metal or metals present therein, as described more fully hereinafter. In case the ore has not been heated to the necessary temperature for reduction when it enters chamber 22, the heating thereof to the required temperature may also be completed in this chamber, by contact with hot combustion gases from chamber 38 and with the hot hydrocarbon fluid itself.

From the bottom of chamber 22, the ore is discharged continuously or intermittently and introduced into the top of the reducing chamber 36 in furnace 3, by operating screw conveyer 50 with gate 57 in open position. A vertically extending body of ore is thus continually maintained within the chamber 36, and heat is supplied thereto indirectly through the walls of the inner housing 31, from the hot combustion gases in the surrounding furnace chamber 38. Hot combustion gases from the fluid heating unit 81 are introduced into the bottom of chamber 38 through flue 91 and housing 92, and the hot gases passing through the housing 92 also serve to heat the ore in the lower conical portion of chamber 36. Additional hot combustion gases are also supplied to chamber 38 by the combustion of gas or other fuel at burners 45. Thus, heat is supplied through the walls of chamber 36 to the vertically extending ore body therein, in an externally heated zone extending throughout at least the major portion of the height of said ore body.

Heated hydrocarbon fluid from coils 85 of heater 81 is delivered through pipes 95 and nozzles 105 and 106, into direct and intimate contact with the ore in chamber 36 at a plurality of vertically spaced positions intermediate the height of the externally heated zone.

For best results the ore within the reducing chamber 36, and also in the lower portion at least of chamber 22 of furnace 2, is maintained at a temperature between about 650° and about 800° C., although in some cases satisfactory results are obtained at temperatures as low as about 400° C. or as high as about 900° C.

It will be understood that the fluid preheater 81 is operated continuously and that hydrocarbon fluid is continuously supplied to the heating coils 85 thereof, in which it is heated to a temperature at least approximating, and preferably somewhat above (for example, about 100° to 150° C. above) the temperature of the ore in the furnaces 2 and 3.

The hydrocarbon fluid employed may be either a gas or a liquid. In general, I prefer to use a hydrocarbon gas, if a supply thereof is available. The term hydrocarbon gas is understood to include either natural gas, which generally consists principally of methane with some ethane or other higher hydrocarbons, or oil gas or other manufactured gas containing hydrocarbon constituents, produced by thermal cracking or decomposition of liquid petroleum products, and generally containing hydrogen and carbon monoxide in addition to methane and other hydrocarbons.

Where an adequate supply of hydrocarbon gas is not available, I may use a hydrocarbon liquid such as, for example, fuel oil, gas oil, or other liquid petroleum product or fraction. However, as noted above, the fluid is heated to a relatively high tempertaure in coils 85 of heater 81, for example, to a temperature of about 500° C. or above, and preferably about 750° C. or higher. Practically all liquid petroleum products, upon being heated to such temperatures, are completely converted to the form of gas, either by direct vaporization or by thermal decomposition, or both, to form more volatile products, usually accompanied by formation of carbon or coke. Thus, the fluid leaving the heating coils and introduced into contact with the ore is principally in the form of gas, even though it is originally introduced in liquid form. Any heavy liquid fractions that are not converted to the form of gas in the heating coils may also be carried along with the gas, together with particles of carbon formed in the heating coils.

The term "hydrocarbon fluid" is therefore used herein to include either a gas or a liquid or a mixture thereof, as well as to include material originally introduced in liquid form and converted, by heating, to gaseous form. Furthermore, references herein to the heating of such a fluid will be understood to include heating accompanied by partial or complete conversion of liquid to gas, in case such conversion occurs.

The hydrocarbon fluid, already at high temperature, is brought into intimate contact with the heated ore, both in the lower portion of chamber 22 in furnace 2, and also in the reducing chamber 36 of furnace 3, which together constitute the reducing zone of the intermediate stage. The valves 117 may be so adjusted as to provide for maintaining the most desirable conditions of pressure, and rate of introduction of hydrocarbon fluid, at the different positions of introduction thereof. This hydrocarbon fluid reacts, at the elevated temperature, with the higher oxide or oxides of iron present in the ore, reducing the same in part to the metallic state and in part to ferrous oxide, FeO. The hydrocarbon fluid is also at least partly decomposed upon contact with the ore at the existing temperature, resulting from the formation of gaseous products including hydrogen, and of solid carbon.

The reduction of the higher oxide or oxides in the ore probably results, at least principally, from the reaction thereof with hydrogen and carbon so formed, and these reactions also result in the formation of water vapor and carbon monoxide as gaseous reaction products. Some reduction of the oxides may also take place by direct reaction thereof with the hydrocarbon fluid itself, with the formation of water vapor and of carbon monoxide and/or solid carbon. Some formation of carbon may also occur as the result of reaction of the reduced iron with carbon monoxide formed by the above reactions, or with carbon monoxide present in the hydrocarbon gas introduced into the reducing zone.

I have not determined the exact nature and extent of the various reactions that may be involved in this reduction stage of the process, but the following are illustrative of probable reactions:

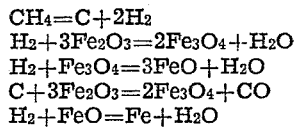

$$CH_4 = C + 2H_2$$
$$H_2 + 3Fe_2O_3 = 2Fe_3O_4 + H_2O$$
$$H_2 + Fe_3O_4 = 3FeO + H_2O$$
$$C + 3Fe_2O_3 = 2Fe_3O_4 + CO$$
$$H_2 + FeO = Fe + H_2O$$

The gaseous reaction products produced in chamber 36 are discharged from the upper end thereof, and are delivered through conduit 53 into chamber 22, or through pipe 61 into the upper portion of chamber 22 or into conduit 53, as described above and dependent upon adjustment of valves 64 and 65 and gate 57. Any gases passing through conduit 53 are brought into further contact with ore therein and in the lower portion of chamber 22, to cause additional reduction.

The gaseous products from chamber 22 of furnace 2 are delivered through conduit 13 into the lower end of the rotary kiln 1. In addition to the hot combustion gases supplied to chamber 22 through pipes 58, these gases also include the gaseous reaction products such as hydrogen and carbon monoxide formed in chambers 36 and 22, and generally some residual unreacted hydrogen or unreacted constituents of the hydrocarbon fluid. As has been stated above, excess air may be introduced into the kiln, at or adjacent the burner 7, for the combustion of combustible constituents contained in these gases, such as carbon monoxide, hydrogen, or hydrocarbons.

According to a preferred procedure, the hydrocarbon fluid may be introduced in the reducing stage (in chambers 36 and 22) in sufficient amount so that the gases leaving that stage will contain enough combustible gases such as unreacted hydrogen or hydrocarbons to provide all the fuel required for combustion in kiln 1, and preferably sufficient excess to maintain a reducing atmosphere therein.

Although some of the carbon formed within the ore bodies in chambers 22 and 36 as the result of decomposition of the hydrocarbon fluid may be consumed in the reduction of the higher oxide or oxides, a portion of the carbon so formed is deposited upon and throughout the ore particles and remains intimately and uniformly dispersed therein, either in the form of free carbon or chemically combined with the reduced iron.

The conditions in furnaces 2 and 3, including temperature, time of contact, and the manner and rate of introduction of the hydrocarbon fluid, are so regulated and maintained that the iron is completely reduced to a state of oxidation lower than $Fe_3O_4$, a portion thereof being reduced to the metallic state and the remainder thereof being reduced to ferrous oxide.

If the gas used is of relatively low hydrocarbon content, as when oil gas or other manufactured gas containing considerable hydrogen or carbon monoxide or both is used, it may be found desirable to enrich the hydrocarbon content by introducing a hydrocarbon liquid either with the gas or separately, in order to increase the deposition of carbon in the ore. If desired, hydrocarbon liquid may be supplied through some of the heating coils 85 and hydrocarbon gas through others. For example, I may supply hydrocarbon liquid to the coil or coils connected to some or all of the nozzles 113 in chamber 22, and hydrocarbon gas to the remaining coils.

The ore delivered to the top of the ore body in chamber 36 is moved downwardly by gravity, as treated ore is withdrawn from the bottom of said chamber, and the reduction proceeds progressively as the ore descends.

The partially reduced ore, with the carbon deposited therein, is delivered continuously or intermittently from the bottom of chamber 36 into the electric furnace 4, by operating screw conveyer 71 with gate 75 in open position. In this final stage of the process in the electric furnace, the ore is heated in the presence of sufficient carbon or other solid reducing agent to complete the reduction of the iron to the metallic state, and to a sufficient temperature to complete such reduction and fuse the resulting metal, the gangue constituents being also fused to form a slag. The temperature required in this stage is ordinarily between about 1300° and 1650° C. In case the amount of carbon contained in the ore discharged from furnace 3 is insufficient to complete the reduction of the metal in the electric furnace, and to provide such additional carbon as may be desired in the finished steel or other metal product, I may add the required amount of additional carbon to the charge in the electric furnace, preferably in the form of crushed or powdered coke. In general, however, and under preferred conditions of operation, the amount of carbon contained in the ore delivered to this furnace is sufficient for these purposes.

In some cases I find it advantageous to also introduce hydrocarbon material with the ore entering the process, in order to increase the deposition of carbon in the ore and thus insure the presence in the ore delivered to the electric furnace of sufficient carbon to complete the reduction of the iron to the metallic state, since I have found that the final reduction can be effected more advantageously when the requisite amount of carbon is thus deposited in divided condition on and within the partially reduced ore particles than by means of carbon introduced directly into the electric furnace.

According to a preferred procedure, therefore, the crushed ore particles are first coated with a hydrocarbon liquid such as fuel oil or other heavy oil consisting principally of relatively high-boiling point hydrocarbons, as by spraying such liquid thereon, prior to introduction into the first stage of the process in the rotary kiln 1. The heating of the ore in the preheating and reducing stages of the process decomposes the hydrocarbons on the surfaces of the ore particles, resulting in deposition of carbon thereon in finely divided condition, in addition to the carbon formed by decomposition of the hydrocarbon fluid introduced in the reducing stage. This serves to reduce the amount of hydrocarbon fluid that must be introduced in the reducing stage in order to obtain the desired carbon content in the partially reduced ore delivered to the electric furnace. Furthermore, the coating of the ore in this manner eliminates any tendency of the heated ore particles to adhere to the walls of the furnaces or other equipment through which it is moved.

Carbon monoxide is produced by the reaction of the carbon with the metal oxide or oxides in the electric furnace, and serves to maintain a reducing atmosphere therein and to prevent inward leakage of air into this part of the system. The gases so produced may be vented from the furnace in any desired manner and may, if desired, be utilized as fuel in or in conjunction with the process.

It will be understood, of course, that any desired fluxing agent may be used in connection with the ore, such as lime or some other material commonly used for this purpose, to promote fusion of gangue constituents in the electric furnace and the formation of a slag that separates readily and completely from the molten metal, and any such fluxing agent is preferably added to the ore delivered into the rotary kiln 1 so as to be dried and heated along with the ore.

It will also be understood that other metals may be introduced in the process for the purpose of alloying with the reduced iron to form special alloys. Such alloying constituents may for example be added to the charge in the electric furnace. As another example, I may produce special grades of steel for various purposes, by adding to the original ore charge entering the process a suitable proportion of ore containing an alloying metal such as manganese, chromium, tungsten, or molybdenum, the other metal so introduced being also reduced to the metallic state by the above described treatment.

When the reduction and smelting is completed in the electric furnace, the slag and molten steel or other metal are withdrawn, either separately or together, and the metal may be solidified in the form of ingots or cakes, in well known manner.

One advantage of the process is that it makes possible the production of steel substantially free from absorbed nitrogen, due to the absence of contact of reduced metallic iron with air or other nitrogen-bearing gas at a temperature sufficient to cause absorption of nitrogen. Air is completely excluded from the electric furnace 4 in which the fusion of the iron and formation of steel take place, and is also excluded from the zone or zones in which the reduction by contact with hydrocarbon fluid takes place, that is, in the lower portion of chamber 22 and in chamber 36. Furthermore, the temperature in chambers 22 and 36 is insufficient to cause appreciable absorption of nitrogen by metallic iron even if some nitrogen is present, for example, as an impurity in the natural gas or other hydrocarbon fluid.

In some cases I may prefer to use a simplified procedure, in which the rotary kiln 1 is omitted and the crushed ore is charged directly into the chamber 22 of furnace 2 and the preheating and drying of the ore is conducted in the upper part of said chamber. In order to obtain combustion in the upper part of chamber 22 for this purpose, air may be introduced through one or more of the pipes 58, as by simply venting one or more of these pipes to the atmosphere. However, I prefer in such cases to provide other means for introducing combustion air and means for charging ore directly into this furnace, and the construction of the upper part of furnace 2 may therefore be modified as indicated in Fig. 8.

Referring to Fig. 8, the upper part of this modified furnace is indicated at 2', having a chamber 22' corresponding to chamber 22 in Fig. 1. A central opening 14' at the top of the furnace is connected directly to a stack 125 provided with a damper 126. A suitable number of charging openings 127 are provided in top wall 16'. Each of these charging openings is shown as provided with a pivotally mounted door 128 movable to wide open position for charging ore into the furnace and to closed or partly closed position over openings 127. The construction of furnace 2' is in other respects the same as described in connection with furnace 2 and it is similarly provided with pipes 58 and 112 as shown in Fig. 4, for introducing hot combustion gases and hydrocarbon fluid into the upper and lower portions respectively of chamber 22'.

When using this modified type of furnace, the rotary kiln 1 and its appurtenant parts are omitted, and the remainder of the apparatus is constructed and arranged in the same manner as described above and illustrated in Figs. 1 through 7.

By maintaining the doors 128 in partly open position during normal operation, combustion air is drawn downward through the openings 127 by the draft and toward the top of the ore body, in sufficient amount to support combustion of combustible constituents present in the gases rising through the ore body and also of combustible gases from chamber 36 of furnace 3 which may, if desired, be delivered into the upper portion of chamber 22' through one or more pipes 58 shown in Fig. 4, as described above in connection with that figure. This combustion takes place at the top of and immediately above the body of ore in chamber 22' and serves to dry and preheat the ore within the upper portion of such ore body. At this position, the ore is quite free to expand on heating, without causing any tendency to become jammed and prevent free downward movement of the ore, as would be the case if this heating occurred at a lower position in the ore body. As before, I prefer to maintain a reducing atmosphere in chamber 22' so as to also obtain reduction of the ore therein.

In the operation of this form of apparatus the ore is charged into furnace 2' and is dried and heated in the upper portion thereof to a suitable temperature such as described above in connection with rotary kiln 1, and then passes downward through this furnace, through furnace 3, and into the electric furnace 4, the process being conducted in substantially the same manner as previously described. Additional combustion air may, if desired, be admitted through some of the nozzles 113 in the lower portion of the furnace 2'. For example, a pair of pipes 112 leading to two diametrically opposite nozzles 113 (see Fig. 4) may be connected to one of the heating coil pipes 116, and air may be introduced through the corresponding heating coil 85 instead of hydrocarbon fluid. The air so introduced is preheated in passing through the heater 81, and is delivered through said nozzles 113 and used to support combustion of combustible constituents present in the lower portion of chamber 22', such combustible constituents being either introduced thereto through the other pair of nozzles 113 in the form of a hydrocarbon fluid or being formed as the result of reactions within the apparatus as described above. This additional combustion serves, when necessary, to further raise the temperature of the ore to the point required for reduction.

According to another modification, the process may be carried out in the modified form of apparatus shown in Fig. 9, which comprises three successive furnaces or heating units, a rotary kiln 131, a reducing furnace 132, and an electric furnace 133. The rotary kiln 131 is similar to the kiln 1 shown in Fig. 1 and is similarly provided with upper and lower end housings 134 and 135, stack 136, ore supply means 137 and burner means 138. The interior of said kiln constitutes an ore preheating chamber. At the lower end of the kiln the ore is discharged therefrom through an inclined chute 140 into the upper end of the reducing furnace 132.

The furnace 132 comprises an inner housing 139 and an outer housing 141. The construction of this furnace is shown more fully in Figs. 10 and 12. The inner housing 139 is generally similar to that shown at 31 in Fig. 4, but is shown as being of somewhat greater height in proportion to its diameter. It is of cylindrical cross-section throughout the major portion of its height and is provided with a conical bottom portion 142, and is closed at its upper end to define therewithin a completely enclosed vertically extending reducing chamber 143 in which a vertically extending body of ore is continually maintained during operation of the process, as indicated at 144 in Fig. 9. Means are provided for excluding atmospheric air from chamber 143, for admitting hydrocarbon fluid thereto under suitable pressure, and for maintaining a pressure therein somewhat above atmospheric pressure, as described more fully hereinafter.

The outer housing 141 is generally similar to that shown at 39 in Fig. 4, whereby an annular furnace chamber 145 is provided surrounding the reducing chamber 143 throughout the major portion of its height. It is provided, as before, with burner openings 146 and burner means 147, arranged in the same manner as those shown at 44 and 45 in Fig. 4.

The inner housing 139 is provided at its upper end with hopper means 148 for conducting ore from chute 140 into the reducing chamber 143, and suitable means are provided for controlling the movement of ore through said hopper means. Said control means is shown as arranged to provide for intermittent charging of ore into the reducing chamber, and may, for example, be comparable to the double bell or cone arrangement commonly used for controlling the supply of materials into a blast furnace. In the form of apparatus shown in Fig. 12, the hopper 148 has an upper hopper compartment 148a communicating with the lower end of chute 140 and a lower hopper compartment 148b communicating with chamber 143 through a central opening 149 in the top wall of the inner housing 139, the upper and lower compartments communicating with each other through an opening 151. Hopper 148 is located centrally within an upward extending portion 152 of the furnace housing, and the surrounding space 145a constitutes an upward extension of the furnace chamber 145, for heating material within the hopper. The housing portion 152 is provided with a top wall 153 closing the upper end of space 145a. Conical valves or gates 154 and 155 are disposed adjacent openings 151 and 149, respectively, and these cones are shown as mounted on a centrally located vertical pipe 156 which is in turn supported at its upper end by an operating lever 157, whereby both cones may be raised to closed position, as shown, and may be lowered to positions removed from the hopper openings to permit downward movement of ore. Pipe 156 also serves to conduct gases from the upper end of the reducing chamber 143 to the burner means 138. Said pipe is open at its lower end, in communication with chamber 143. It extends slidably through burner means 138 and is provided with a nozzle or opening 158 within the burner for delivering gas thereto, and is closed at its upper end.

Additional combustible gas or other fuel may if desired be supplied to burner means 138 through pipe 159. Pipes 156 and 159 are shown provided with valves 161 and 162 for controlling flow therethrough.

Means are provided for conducting hot combustion gases from the furnace chamber 145 of reducing furnace 132 into the rotary kiln 131, and such means is shown as comprising the upper hopper compartment 148a and chute 140, said compartment communicating with space 145a through a plurality of openings 163 in the wall of hopper 148. Pipes 164 are also shown leading from the top of the reducing chamber 143 into lower hopper compartment 148b for admitting gases from said chamber into said compartment, as described hereinafter.

An inclined conduit or chute 165 leads from the bottom of the reducing chamber, for conducting treated ore therefrom and charging it into the electric furnace 133, and said conduit may be provided with a gate valve 166 or other suitable means for normally retaining the ore in the reducing chamber and intermittently charging the electric furnace. The electric furnace 133 is similar in construction and mode of operation to that shown at 4 in Fig. 1, the means for discharging molten metal and slag therefrom being indicated diagrammatically at 167 and 168.

The fluid preheating means is indicated at 171. It may be of the same construction and arrangement as the preheater 81 described above, but I have shown in this case a somewhat different construction comprising a refractory lined cylindrical furnace housing defining a combustion chamber 172 and provided at one end with burner means 173. The hot combustion gases are discharged from furnace 171 at the other end through a plurality of conduits or flues 174 communicating with the furnace chamber 145 at positions spaced 90° apart and midway between the burner openings 146 as indicated at 175 in Fig. 10.

Ten separate heating coils extend longitudinally within the combustion chamber 172, as indicated at 176, and are mounted on suitable refractory supporting means 177. The respective heating coils are connected through separate pipes 178 to a common fluid supply line 179, each of the pipes 178 being provided with a valve 181 for regulating the supply of hydrocarbon fluid to the respective heating coils.

The means for supplying heated hydrocarbon fluid to the reducing chamber 143 comprises eight pipes 182 similar in construction and arrangement to the pipes 95 described above and provided at their upper ends with similar means (as shown in Fig. 7) for introducing fluid into the ore body, and two pipes 183 corresponding to the pipes 107 and 108 in Fig. 4 communicating with separate compartments within a centrally disposed vertical pipe 184 having upper and lower sets of nozzles 185 and 186 communicating with the respective compartments, in substantially the same manner as described above in connection with Fig. 4. In this case the centrally located pipe 184 is shown as mounted directly on the furnace housing at its lower end and supported at its upper end by bars 187 secured to the side wall of the inner housing 139.

The above described pipes 182 and 183 enter furnace 171 through the rear wall thereof and are connected as indicated at 188 in Fig. 11 to the respective heating coils 176. It will be noted that in this case a separate heating coil 176 and a separate regulating valve 181 is provided for each of the individual pipes 182 and 183.

In carrying out the process in this form of the apparatus, the ore is first dried and preheated, and preferably partly reduced, in rotary kiln 131 in the same manner as described above in connection with the other form of apparatus, the ore being heated therein by direct contact with hot combustion gases from burner 138 and also by hot gases coming from the heating chamber 145 of the reducing chamber 141.

The rotary kiln is preferably operated continually and the heated ore is discharged from the lower end thereof through inclined chute 140 into the upper hopper 148a. At suitable intervals additional quantities of this material are introduced into reducing chamber 143 by lowering the cones 154 and 155 to discharge material from the upper hopper into the lower hopper 148b, and from the lower hopper into the reducing chamber. During normal operation, a body of ore is continually maintained within chamber 143 up to a level above the positions of introduction of hydrocarbon fluid, for example, to some such level as indicated at 144 in Fig. 9, the gate valve 166 being normally closed to retain such ore body within this chamber and to complete the gas-tight enclosure thereof.

During the time the ore is within the hopper compartments 148a and 148b, it is kept heated at substantially constant temperature by hot combustion gases passing through the chamber 145a and through the upper hopper compartment. The ore body within the reducing chamber 143 is also heated externally in a zone extending throughout the major portion of the height of said ore body, by hot combustion gases in furnace chamber 145, including gases produced by combustion of fuel at burner 147 and gases delivered to chamber 145 through flues 174, in substantially the same manner as described above.

Fuel is continually burned at burner 173 to heat the coils 176 in the fluid preheater 171, and hydrocarbon fluid is continually supplied to said coils. The heated hydrocarbon fluid is delivered through pipes 182 and 183 and introduced into the heated ore body in chamber 143 at a plurality of vertically spaced positions intermediate the height of the externally heated zone, through the upper ends of pipes 182 and through nozzles 185 and 186, to effect partial reduction of metal therein and formation of finely divided carbon, some of which remains deposited upon and within the ore particles, in the same manner as described above.

The reduction proceeds progressively as the ore descends by gravity within chamber 143, the partially reduced ore and deposited carbon being delivered continuously or intermittently from the bottom of said chamber, through chute 165 into electric furnace 133, in which the reduction is completed and the reduced metal is fused, as described above.

It will be seen that in this case also air is completely excluded from the zones in which the reduction and smelting take place, a slight superatmospheric pressure being maintained in these zones by the gases introduced thereto or produced by the reactions occurring therein. The gaseous reaction products from electric furnace 133 may be vented therefrom in any suitable manner. The gaseous products from reducing chamber 143 which, as before, contain combustible constituents such as hydrogen, carbon monoxide, or hydrocarbons, are delivered through pipe 156 to burner means 138, where such constituents are burned to heat the ore in kiln 131. Some of these gases also pass through pipes 164 into the lower hopper compartment 148b, particularly when the cone 154 is moved to open position to permit gas to pass into the upper compartment 148a, and some reduction is thus accomplished by contact of these gases with the heated ore in the hopper 148.

The hot combustion gases from furnace chamber 145 pass upward through the space 145a and thence through openings 163, hopper compartment 148a, and chute 140 into the rotary kiln 131, and the heat of these gases is thus utilized in drying and preheating the ore in said kiln.

It will be understood that in any of the forms of apparatus above described, suitable indicating or recording instruments may be provided at suitable positions in the system, for indicating or recording the temperature, pressure, rate of flow of gas or fluid, or other operating conditions which are to be controlled.

The following tabulated data show the conditions employed and results obtained in a specific example of the process, as applied to a particular type of ore:

Ore treated—hematite ore, containing 35.71% iron.
Flux (added to ore entering the first stage of the process)—15 lbs. lime rock per 100 lbs. of ore.
Temperature of ore leaving first stage—750° C.
Temperature of ore in reducing stage—750° C.
Hydrocarbon fluid introduced in reducing stage (natural gas, containing approximately 70% $CH_4$ and 20% $C_2H_6$)—12,000 cu. ft. per ton of ore.
Temperature of preheated hydrocarbon fluid introduced in reducing stage—800° C.
Partially reduced ore discharged from reducing stage to electric furnace—85% of total iron content reduced to metallic iron; remainder present as FeO; contains approximately 1% carbon.
Final metal product discharged from electric furnace—steel containing 0.9% carbon.

I claim:

1. A process for the recovery of iron from an ore containing an oxide thereof higher than FeO, which comprises: subjecting the ore in divided condition to contact with hot combustion gases in a first stage in which the ore is free to expand on heating, to remove water present in the ore and heat the ore to a temperature between about 400° C. and about 900° C.; thereafter delivering the dried and heated ore into an enclosed vertically extending chamber and maintaining a vertically extending body of such ore within said chamber; supplying heat to said ore body through the walls of said chamber in an externally heated zone extending throughout a major portion of the height of said ore body, to maintain said ore body at a temperature between about 400° C. and 900° C. within said zone; introducing a preheated hydrocarbon fluid into contact with the ore in said body at a plurality of positions intermediate the height of said externally heated zone, to cause reduction of iron in said ore within the body to a state of oxidation lower than $Fe_3O_4$ and partially to metallic iron; removing from the lower end of the ore body partially reduced ore containing iron completely reduced to a state of oxidation lower than $Fe_3O_4$ and partially reduced to metallic state; subjecting the ore so removed to further heating in the presence of a solid reducing agent at a temperature sufficient to complete the reduction of the iron to the metallic state and cause fusion thereof; and recovering the resulting metallic iron.

2. A process for the recovery of iron from an ore containing an oxide thereof higher than FeO, which comprises: subjecting the ore in divided condition to contact with hot combustion gases in a first stage in which the ore is free to expand on heating to remove water present in the ore and heat the ore to a temperature between about 400° C. and about 900° C.; thereafter delivering the dried and heated ore into an enclosed vertically extending chamber and maintaining a vertically extending body of such ore within said chamber; supplying heat to said ore body through the walls of said chamber in an externally heated zone extending throughout a major portion of the height of said ore body, to maintain said ore body at a temperature between about 400° C. and 900° C. within said zone; introducing a preheated hydrocarbon fluid into contact with the ore in said body at a plurality of positions intermediate the height of said externally heated zone, to cause reduction of iron in said ore within the body to a state of oxidation lower than $Fe_3O_4$ and partially to metallic iron, and to cause deposition on the ore of carbon formed by decomposition of the hydrocarbon fluid; removing from the lower end of the ore body partially reduced ore containing iron completely reduced to a state of oxidation lower than $Fe_3O_4$ and partially reduced to metallic state and also containing carbon; subjecting the ore so removed to further heating in the presence of a solid reducing agent including the carbon present in the ore, at a temperature sufficient to complete the reduction of the iron to the metallic state and cause fusion thereof; and recovering the resulting metallic iron.

3. In a process for the recovery of iron from an ore containing a higher oxide thereof, the steps that comprise: maintaining a vertically extending body of such an ore in divided condition within an enclosed chamber; supplying heat to said ore body through the walls of said chamber in an externally heated zone extending throughout a major portion of the height of said ore body, to maintain the ore at a temperature between about 400° C. and about 900° C. within said zone; and introducing a preheated hydrocarbon fluid into contact with the ore at a plurality of positions intermediate the height of said externally heated zone, to cause reduction of iron in said ore within the body to a state of oxidation lower than $Fe_3O_4$ and partially to metallic iron.

4. In a process for the recovery of iron from an ore containing a higher oxide thereof, the steps which comprise: maintaining a vertically extending body of such an ore in divided condition within an enclosed chamber; supplying heat to said ore body through the walls of said chamber in an externally heated zone extending throughout a major portion of the height of said ore body, to maintain the ore at a temperature between about 400° C. and about 900° C. within said zone; heating a hydrocarbon fluid externally of said chamber to a temperature at least approximating the temperature of the ore in said heated zone; introducing said heated hydrocarbon fluid into contact with the ore at a plurality of vertically spaced positions intermediate the height of said externally heated zone, to cause partial reduction of iron therein and produce gaseous reaction products; removing such gaseous reaction products from said chamber above the ore body; and supplying additional preheated ore to the upper end of said ore body and removing ore containing partially reduced iron from the lower end of the ore body at such a rate that the iron in the ore reaching the lower end of the body is completely reduced to a state of oxidation lower than $Fe_3O_4$ and partially reduced to metallic iron.

5. In a process for the recovery of iron from an ore containing a higher oxide thereof, the steps which comprise: maintaining a vertically extending body of such ore in divided condition within an enclosed chamber; supplying heat to said ore body through the walls of said chamber in an externally heated zone extending throughout a major portion of the height of said ore body, to maintain the ore at a temperature between about 650° C. and about 800° C. within said zone; heating a hydrocarbon fluid externally of said chamber to a temperature at least approximating the temperature of the ore in said heated zone; introducing said heated hydrocarbon fluid into contact with the ore at a plurality of positions intermediate the height of said externally heated zone, to cause partial reduction of iron therein and produce gaseous reaction products; removing such gaseous reaction products from said chamber above the ore body; and supplying additional preheated ore to the upper end of said ore body and removing ore containing partially reduced iron from the lower end of the ore body at such a rate that the iron in the ore reaching the lower end of the body is completely reduced to a state of oxidation lower than $Fe_3O_4$ and partially reduced to metallic iron.

6. A process for the recovery of iron from an ore containing an oxide thereof higher than FeO, which comprises: coating the ore in divided condition with a hydrocarbon liquid of high boiling point; forming a vertically extending body of such coated ore within an enclosed chamber; heating such body of ore to maintain it at a temperature between about 400° C. and about 900° C., while introducing a preheated hydrocarbon fluid into contact with the ore in said body, to cause reduction of iron in said ore to a state of oxidation lower than $Fe_3O_4$ and partially to metallic iron and to cause deposition on the ore of carbon formed by decomposition of said hydrocarbon liquid and said hydrocarbon fluid; removing from said chamber the partially reduced ore containing such carbon; and subjecting the ore so removed to further heating in the presence of such carbon at a sufficient temperature to complete reduction of the iron to the metallic state and cause fusion thereof.

7. A process for the recovery of iron from an ore containing an oxide thereof higher than FeO, which comprises: subjecting the ore in divided condition to contact with hot combustion gases in a first stage in which the ore is free to expand on heating, to remove water present in the ore and heat the ore to a temperature between about 400° C. and about 900° C.; delivering the dried and heated ore to a chamber and introducing a preheated hydrocarbon fluid into contact with the ore in said chamber, to effect partial reduction of iron in said ore; delivering the ore, after such partial reduction, into an enclosed vertically extending chamber and maintaining a vertically extending body of such ore within said last mentioned chamber; supplying heat to said ore body through the walls of said last mentioned chamber in an externally heated zone extending throughout a major portion of the height of said ore body, to maintain said ore body at a temperature between about 400° C. and 900° C. within said zone; introducing a preheated hydrocarbon fluid into contact with the ore in said body at a plurality of positions intermediate the height of said externally heated zone, to cause reduction of iron in said ore within the body to a state of oxidation lower than $Fe_3O_4$ and partially to metallic iron; removing from the lower end of the ore body partially reduced ore containing iron completely reduced to a state of oxidation lower than $Fe_3O_4$ and partially reduced to metallic state; subjecting the ore so removed to further heating in the presence of a solid reducing agent at a temperature sufficient to complete the reduction of the iron to the metallic state and cause fusion thereof; and recovering the resulting metallic iron.

8. In a process for the recovery of iron from an ore containing a higher oxide thereof, the steps that comprise: heating the ore in divided condition to remove water therefrom and to heat the ore to a temperature between about 400° C. and about 900° C.; delivering the dried and heated ore to a chamber and introducing a preheated hydrocarbon fluid into contact with the ore in said chamber, to effect partial reduction of iron in said ore; delivering the ore, after such partial reduction, into an enclosed vertically extending chamber and maintaining a vertically extending body of such ore within said last mentioned chamber; supplying heat to said ore body through the walls of said last mentioned chamber in an externally heated zone extending throughout a major portion of the height of said ore body, to maintain the ore at a temperature between about 400° C. and about 900° C. within said zone; and introducing a preheated hydrocarbon fluid into contact with the ore at a plurality of positions intermediate the height of said externally heated zone, to cause reduction of iron in said ore within the body to a state of oxidation lower than $Fe_3O_4$ and partially to metallic iron.

9. A process for the recovery of iron from an ore containing an oxide thereof higher than FeO, which comprises: subjecting the ore in divided condition to contact with hot combustion gases in a first stage in which the ore is free to expand on heating, to remove water present in the ore and heat the ore to a temperature between about 400° C. and about 900° C.; thereafter delivering the dried and heated ore into an enclosed vertically extending chamber and maintaining a vertically extending body of such ore within said chamber; supplying heat to said ore body through the walls of said chamber in an externally heated zone extending throughout a major portion of the height of said ore body, to maintain said ore body at a temperature between about 400° C. and 900°

C. within said zone; introducing a preheated hydrocarbon fluid into contact with the ore in said body at a plurality of vertically spaced positions intermediate the height of said externally heated zone, to cause reduction of iron in said ore within the body to a state of oxidation lower than $Fe_3O_4$ and partially to metallic iron; removing from the lower end of the ore body partially reduced ore containing iron completely reduced to a state of oxidation lower than $Fe_3O_4$ and partially reduced to metallic state; subjecting the ore so removed to further heating in the presence of a solid reducing agent at a temperature sufficient to complete the reduction of the iron to the metallic state and cause fusion thereof; and recovering the resulting metallic iron.

10. In a process for the recovery of iron from an ore containing a higher oxide thereof, the steps that comprise: maintaining a vertically extending body of such an ore in divided condition within an enclosed chamber; supplying heat to said ore body through the walls of said chamber in an externally heated zone extending throughout a major portion of the height of said ore body, to maintain the ore at a temperature between about 400° C. and about 900° C. within said zone; and introducing a preheated hydrocarbon fluid into contact with the ore at a plurality of vertically spaced positions intermediate the height of said externally heated zone, to cause reduction of iron in said ore within the body to a state of oxidation lower than $Fe_3O_4$ and partially to metallic iron.

ELFEGO RIVEROLL.

REFERENCES CITED

The following references are of record in the file of this patent:

UNITED STATES PATENTS

| Number | Name | Date |
| --- | --- | --- |
| 1,370,915 | Riveroll | Mar. 8, 1921 |
| 1,864,593 | Gustafsson | June 28, 1932 |
| 1,934,082 | Moll | Nov. 7, 1933 |
| Re. 19,770 | Brown | Dec. 3, 1935 |
| 2,048,112 | Gahl | July 21, 1936 |
| 2,296,522 | Hartley | Sept. 22, 1942 |

OTHER REFERENCES

Transactions, American Institute of Mining and Metallurgical Engineers, vol. 140, pages 106 and 107.